US012671219B2

(12) United States Patent
Minamide et al.

(10) Patent No.: US 12,671,219 B2
(45) Date of Patent: Jun. 30, 2026

(54) CONDUCTIVE STRUCTURAL BODY AND CONDUCTION METHOD

(71) Applicant: NOK CORPORATION, Tokyo (JP)

(72) Inventors: Kota Minamide, Fukushima (JP);
Toshiki Watanabe, Fukushima (JP);
Masatoshi Seki, Fukushima (JP); Shota Ohashi, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 19/357,850

(22) Filed: Oct. 14, 2025

(65) Prior Publication Data

US 2026/0039078 A1      Feb. 5, 2026

Related U.S. Application Data

(63) Continuation of application No. PCT/JP2025/001476, filed on Jan. 17, 2025.

(30) Foreign Application Priority Data

Jun. 20, 2024      (JP) ................................. 2024-100021

(51) Int. Cl.
*H01R 39/64* (2006.01)
*F16J 15/3228* (2016.01)
*F16J 15/3232* (2016.01)

(52) U.S. Cl.
CPC .......... *H01R 39/64* (2013.01); *F16J 15/3228* (2013.01); *F16J 15/3232* (2013.01)

(58) Field of Classification Search
CPC ..... H01R 39/64; F16J 15/3228; F16J 15/3232
USPC .......................................................... 439/18
See application file for complete search history.

(56) References Cited

U.S. PATENT DOCUMENTS

| | | |
|---|---|---|
| 2013/0057096 A1 | 3/2013 | Okada et al. |
| 2014/0203514 A1 | 7/2014 | Colineau et al. |
| 2018/0313449 A1 | 11/2018 | Dahlhaus-Preussler et al. |
| 2019/0270477 A1 | 9/2019 | Endo et al. |
| 2020/0295634 A1* | 9/2020 | Lenz .................... H01R 39/025 |
| 2021/0180698 A1 | 6/2021 | Wagner |
| 2022/0384986 A1 | 12/2022 | Bantz et al. |

(Continued)

FOREIGN PATENT DOCUMENTS

| | | |
|---|---|---|
| EP | 4 585 834 | 7/2025 |
| JP | 62-106125 | 5/1987 |

(Continued)

OTHER PUBLICATIONS

"Conductive Ring", available at https://products.nokgrp.com/c_onductive-ring_basicinfo.html, [undated] retrieved on Jan. 14, 2026.

(Continued)

*Primary Examiner* — Tulsidas C Patel
*Assistant Examiner* — Jeffrey Mountain
(74) *Attorney, Agent, or Firm* — GREENBLUM & BERNSTEIN, P.L.C.

(57) ABSTRACT

A conductive structural body is a conductive structural body that forms a conductive path in an annular gap. The conductive structural body includes a closure member that is annular around an axis line x and closes a gap, and a conductive path member that is annular around the axis line x and forms a conductive path. The conductive path member penetrates the closure member in a radial direction.

9 Claims, 3 Drawing Sheets

1

(56)  References Cited

U.S. PATENT DOCUMENTS

| | | |
|---|---|---|
| 2024/0035573 A1 | 2/2024 | Yoshimura |
| 2025/0198515 A1 | 6/2025 | Kamiya et al. |

FOREIGN PATENT DOCUMENTS

| | | | | |
|---|---|---|---|---|
| JP | 2006-57825 | 3/2006 | | |
| JP | 2014-142065 | 8/2014 | | |
| JP | 5943033 | 6/2016 | | |
| JP | 6220724 | 10/2017 | | |
| JP | 2019-509007 A | 3/2019 | | |
| JP | 6607984 | 11/2019 | | |
| JP | 6732835 | 7/2020 | | |
| JP | 6994414 | 1/2022 | | |
| JP | 7033538 | 3/2022 | | |
| JP | 2022-182952 | 12/2022 | | |
| JP | 2024-15715 | 2/2024 | | |
| JP | 7437539 | 2/2024 | | |
| JP | 2024-45492 | 4/2024 | | |
| JP | 2024-162919 | 11/2024 | | |
| JP | 7671396 | 5/2025 | | |
| JP | 7671417 | 5/2025 | | |
| JP | 2025-96604 | 6/2025 | | |
| JP | 7686894 | 6/2025 | | |
| JP | 7707467 | 7/2025 | | |
| JP | 7707468 | 7/2025 | | |
| JP | 7707469 | 7/2025 | | |
| JP | 2025-121549 | 8/2025 | | |
| JP | 2025-122226 | 8/2025 | | |
| JP | 2025-526103 | 8/2025 | | |
| JP | 2025-534608 | 10/2025 | | |
| JP | 7752273 | 10/2025 | | |
| WO | WO-2019239891 A1 * | 12/2019 | .......... | F16J 15/3232 |
| WO | WO-2023162676 A1 * | 8/2023 | .......... | F16J 15/3284 |

OTHER PUBLICATIONS

Japan, Notice of Reasons for Refusal received in JP Application No. 2024-100021, dated Feb. 4, 2025, and English language translation thereof.
Japan, Notice of Reasons for Refusal received in JP Application No. 2025-067648, dated Jul. 15, 2025, and English language translation thereof.

* cited by examiner

100

CONDUCTIVE STRUCTURAL BODY AND CONDUCTION METHOD

CROSS REFERENCE TO RELATED APPLICATIONS

The present application is a bypass continuation of International Patent Application No. PCT/JP2025/001476 filed on Jan. 17, 2025, which claims the benefit of Japanese Patent Application No. 2024-100021, filed on Jun. 20, 2024. The contents of these applications are incorporated herein by reference in their entirety.

BACKGROUND

Technical Field

The present disclosure relates to a conductive structural body and a conduction method, and particularly relates to a conductive structural body and a conduction method for forming a conductive path on a rotating shaft.

Related Art

For example, in vehicles equipped with electric motors, such as electric vehicles (EVs), electromagnetic noise may occur due to induced current generated by the motor. Such electromagnetic noise may cause communication interference with AM radios and other wireless communication instruments. Furthermore, such electromagnetic noise may cause electric corrosion in metal components such as bearings. Thus, measures have been conventionally taken to eliminate such electromagnetic noise, and conductive structural bodies that form conductive paths on rotation shafts have been proposed. For example, a technique has been disclosed that a conductive structural body is attached to a housing of a motor and a conductive member that is disk-shaped and made of a conductive material is brought into contact with the rotation shaft of the motor to form a conductive path between the rotation shaft and the housing, thereby diverting electromagnetic noise from the rotation shaft to the housing (refer to Japanese Translation of PCT International Application Publication No. 2019-509007, for example).

A conductive structural body may suffer corrosion such as rust due to exposure to foreign matter such as mud water, rainwater, and dust, and may decrease in conductivity. Thus, in order to suppress decrease in conductivity due to exposure to foreign matter, a conventional conductive structural body is provided in a mechanism with which contact with foreign matter is suppressed, such as a mechanism surrounded by a casing. In this manner, conventional conductive structural bodies had limitation in their applications.

Thus, configurations capable of preventing decrease in conductivity even when exposed to foreign matter are required for conventional conductive structural bodies.

The present disclosure is made in view of the above-described problem and intended to provide a conductive structural body and a conduction method with which it is possible to suppress decrease in conductivity even when exposed to foreign matter.

SUMMARY

To achieve the above-described intention, a conductive structural body according to the present disclosure is a conductive structural body that forms a conductive path in a gap between a through-hole and a shaft passing through the through-hole, and includes: a closure member that forms a sealing structure that is annular around an axis line to seal the gap; and a conductive path member that is annular around the axis line and forms the conductive path, the closure member includes a seal lip that is annular around the axis line and formed of an elastic material, and a side lip that is annular around the axis line and formed of an elastic material, the seal lip is configured to contact the shaft to seal a sealing target object, the side lip extends toward a side opposite to the seal lip in a direction of the axis line and is configured to contact the shaft to prevent entry of foreign matter from the opposite side, and the conductive path member is located between the seal lip and the side lip.

To achieve the above-described intention, a conductive structural body according to the present disclosure is a conductive structural body that forms a conductive path in an annular gap, and includes: a closure member that is annular around an axis line and closes the gap; and a conductive path member that is annular around the axis line and forms the conductive path, and the conductive path member penetrates the closure member in a radial direction.

In the conductive structural body according to an aspect of the present disclosure, the closure member and the conductive path member are integrated.

In the conductive structural body according to an aspect of the present disclosure, the closure member includes a first body portion that is an annular portion around the axis line, and a second body portion that is an annular portion around the axis line, and the first body portion and the second body portion are configured to be able to be attached to each other in a direction of the axis line with the conductive path member sandwiched in between.

In the conductive structural body according to an aspect of the present disclosure, the conductive path member includes a conductive member that is a member having conductivity and annular around the axis line, the conductive member includes an inner periphery end portion that is an annular portion around the axis line, and the inner periphery end portion is configured to contact an inner periphery member that forms the annular gap.

In the conductive structural body according to an aspect of the present disclosure, the conductive path member includes a metallic member that is an annular member around the axis line and formed of a metallic material, the conductive member and the metallic member overlap each other in a direction of the axis line, and the metallic member is exposed on an outer periphery side.

In the conductive structural body according to an aspect of the present disclosure, the closure member is a sealing structure for sealing the gap.

In the conductive structural body according to an aspect of the present disclosure, the gap is a gap between a through-hole and a shaft passing through the through-hole.

In the conductive structural body according to an aspect of the present disclosure, the gap is a gap between a through-hole and a shaft passing through the through-hole, the closure member is a sealing structure for sealing the gap, the first body portion includes a reinforcement ring that is an annular member around the axis line, and an elastic body portion that is an annular member around the axis line, formed of an elastic material, and attached to the reinforcement ring, the second body portion includes a support ring that is an annular member around the axis line, and an elastic body portion that is an annular member around the axis line, formed of an elastic material, and attached to the support ring, the elastic body portion of the first body portion includes a seal lip that is annular and contacts the shaft, the elastic body portion of the second body portion includes a side lip that is annular and extends toward a side opposite to the first body portion in the direction of the axis line, and the side lip increases in diameter as progress toward the opposite side in the direction of the axis line.

The conductive structural body according to an aspect of the present disclosure is used in a differential device, the through-hole is provided in a housing of the differential device, and the shaft is an output shaft of the differential device.

To achieve the above-described intention, a conduction method according to the present disclosure is a conduction method for forming a conductive path in an annular gap, and includes causing a conductive path member to penetrate a closure member in a radial direction, the conductive path member being a member that is annular around an axis line and forms the conductive path, the closure member being a member that is an annular member around the axis line and closes the gap.

In the conduction method according to an aspect of the present disclosure, the closure member and the conductive path member are integrated.

In the conduction method according to an aspect of the present disclosure, the closure member is configured with a first body portion that is an annular portion around the axis line, and a second body portion that is an annular portion around the axis line, and the first body portion and the second body portion are attached to each other in a direction of the axis line with the conductive path member sandwiched in between.

In the conduction method according to an aspect of the present disclosure, the conductive path member is formed with a conductive member that is a member having conductivity and annular around the axis line, and a metallic member that is annular around the axis line and formed of a metallic material, the conductive member and the metallic member overlap each other in a direction of the axis line, the metallic member is exposed on an outer periphery side, and an inner periphery end portion of the conductive member, the inner periphery end portion being an annular portion around the axis line, is brought into contact with an inner periphery member that forms the annular gap.

In the conduction method according to an aspect of the present disclosure, the closure member seals the gap.

In the conduction method according to an aspect of the present disclosure, the gap is a gap between a through-hole and a shaft passing through the through-hole.

In the conduction method according to an aspect of the present disclosure, the gap is a gap between a through-hole and a shaft passing through the through-hole, the closure member forms a sealing structure for sealing the gap, the first body portion is formed with a reinforcement ring that is an annular member around the axis line, and an elastic body portion that is an annular member around the axis line, formed of an elastic material, and attached to the reinforcement ring, the second body portion is formed with a support ring that is an annular member around the axis line, and an elastic body portion that is an annular member around the axis line, formed of an elastic material, and attached to the support ring, the elastic body portion of the first body portion is brought into contact with the shaft, and the elastic body portion of the second body portion is extended toward a side opposite to the first body portion in the direction of the axis line and is increased in diameter as progress toward the opposite side.

The conduction method according to an aspect of the present disclosure is used for a differential device, the through-hole is provided in a housing of the differential device, and the shaft is an output shaft of the differential device.

Advantageous Effect of Disclosure

With a conductive structural body and a conduction method according to the present disclosure, it is possible to suppress decrease in conductivity even when exposed to foreign matter.

DETAILED DESCRIPTION

Figure 1:
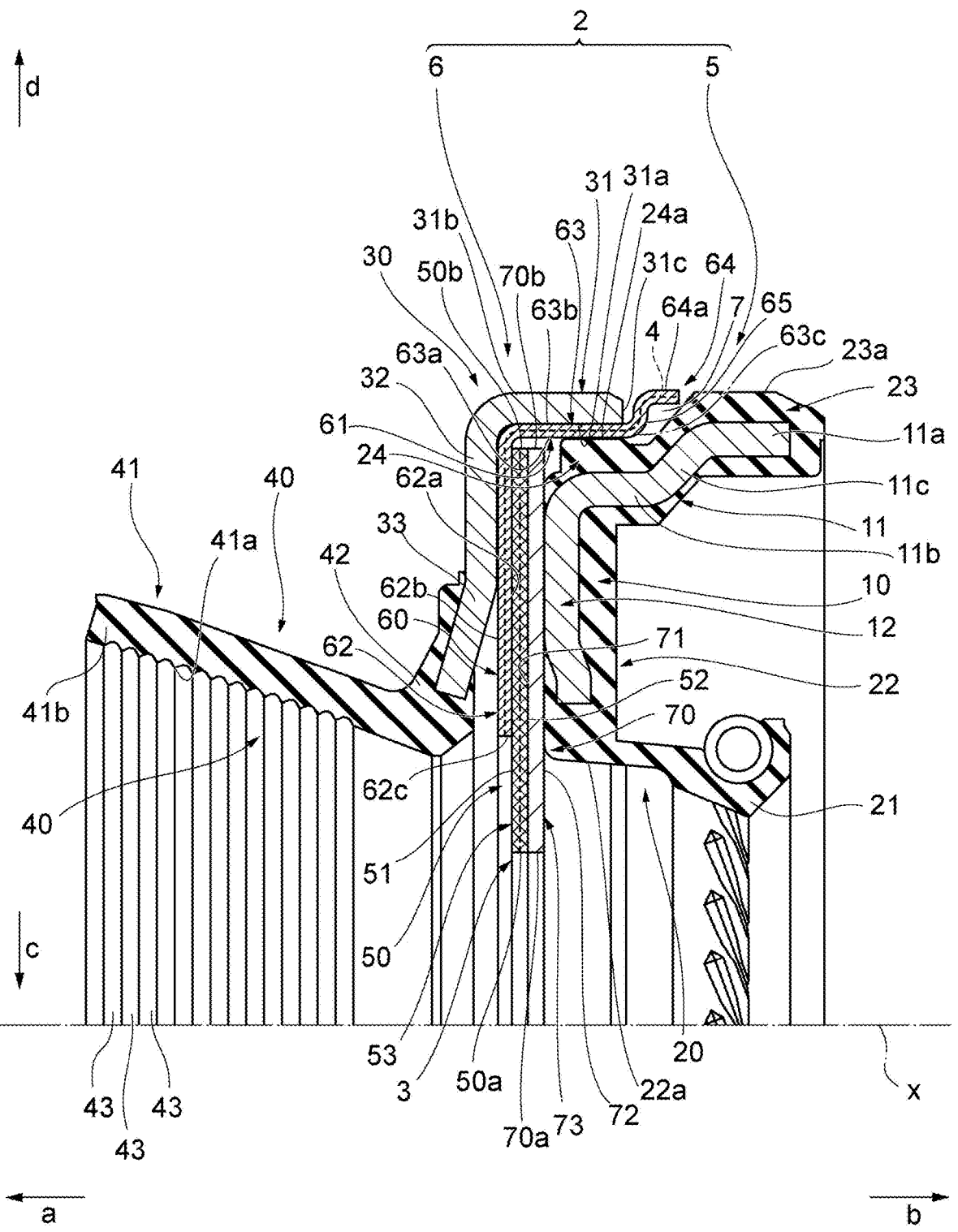
FIG. 1 is a cross-sectional view illustrating a schematic configuration of a conductive structural body according to an embodiment of the present disclosure at a section along a plane including an axis line.

An embodiment of the present disclosure will be described below with reference to the accompanying drawings. Note that, in the drawings, not all of a plurality of constituent components are denoted by reference signs, and reference signs of some of the plurality of constituent components are omitted in some cases.

A conductive structural body and a conduction method according to the present disclosure form a conductive path in an annular gap. The conductive structural body and the conduction method according to the present disclosure form a conductive path, for example, in an annular gap between a shaft and a hole into which the shaft is inserted. A conductive structural body and a conduction method according to the embodiment of the present disclosure are used in, for example, a differential device including a differential mechanism for absorbing a difference in rotational speed between left and right drive wheels during turning in electric vehicles (EVs) such as battery electric vehicles (BEVs) and hybrid vehicles. Examples of differential devices include differential gears in the transaxle of an eAxle, which is an electric drive unit for electric vehicles (EVs). A through-hole is provided in a housing of a differential device, and a shaft is an output shaft of the differential device, which is rotatably inserted into the through-hole. Note that application targets to which the conductive structural body and the conduction method according to the present disclosure are applied are not limited thereto.

FIG. 1 is a cross-sectional view illustrating a schematic configuration of a conductive structural body 1 according to the embodiment of the present disclosure at a section along a plane including an axis line x. FIG. 1 illustrates one side of the section of the conductive structural body 1 with respect to the axis line x. The conductive structural body 1 is a conductive structural body that forms a conductive path in an annular gap, and is used as, for example, a differential gear in the transaxle of an eAxle, which is an electric drive unit. The conductive structural body 1 forms a conductive path in an annular gap between a shaft hole and the output shaft, the shaft hole being a through-hole provided in a housing of the differential gear. As illustrated in FIG. 1, the conductive structural body 1 includes a closure member 2 that is annular around the axis line x and closes the gap, and a conductive path member 3 that is annular around the axis line x and forms a conductive path 4. The conductive path member 3 penetrates the closure member 2 in a radial direction. Hereinafter, the configuration of the conductive structural body 1 will be specifically described.

Note that the radial direction is a direction orthogonal to the axis line x. In the radial direction, a side in a direction approaching the axis line x (refer to arrow c in FIG. 1) is an inner periphery side, and in the radial direction, a side in a direction departing from the axis line x (refer to arrow d in FIG. 1) is an outer periphery side. In the direction of the axis line x, a side toward the direction of arrow a (refer to FIG. 1) is an outer side, and in the direction of the axis line x, a side toward the direction of arrow b (refer to FIG. 1) is an inner side. The outer side is a side toward the outside of an application target, and the inner side is a side toward the inside of the application target. More specifically, the outer side is a side of the differential gear that faces the outside of the housing, which is the atmosphere side, and the inner side is a side of the differential gear that faces the inside of the housing.

As illustrated in FIG. 1, the closure member 2 and the conductive path member 3 are integrated. Specifically, for example, the closure member 2 includes a first body portion 5 that is an annular portion around the axis line x, and a second body portion 6 that is an annular portion around the axis line x, and the first body portion 5 and the second body portion 6 can be attached to each other in the direction of the axis line x with the conductive path member 3 in between.

Accordingly, the closure member 2 and the conductive path member 3 are integrally formed such that the first body portion 5 and the second body portion 6 are attached to each other with the conductive path member 3 in between. The closure member 2 forms, for example, a sealing structure having a configuration for sealing the gap. The conductive path member 3 is located in a space surrounded by the closure member 2 in a usage state of the conductive structural body 1 to be described later, and in the space, protection from foreign matter such as mud water, rainwater, and dust, lubricant as a sealing target object, and the like is ensured.

As illustrated in FIG. 1, the first body portion 5 of the closure member 2 has a configuration substantially the same as that of a well-known sealing device and includes a reinforcement ring 10 that is an annular member around the axis line x, and an elastic body portion 20 that is an annular member around the axis line x, formed of an elastic material, and attached to the reinforcement ring 10. The elastic body portion 20 includes a seal lip 21 that is annular and contacts the output shaft of the differential gear.

As illustrated in FIG. 1, the reinforcement ring 10 includes, for example, a tubular portion 11 that is tubular, and a lip support portion 12 that bends toward the inner side from an end portion of the tubular portion 11 on the outer side and extends toward the inner periphery side. The tubular portion 11 includes, for example, a fitting portion 11a that is a portion on the inner side, and a support portion 11b that is a portion on the outer side. The fitting portion 11a and the support portion 11b are each, for example, a portion in a cylindrical or substantially cylindrical shape having a central axis or a substantially central axis at the axis line x. The support portion 11b is positioned on the inner periphery side of the fitting portion 11a, and a step portion 11c that forms a step in the radial direction is formed between the fitting portion 11a and the support portion 11b. The fitting portion 11a is a portion for fixing the conductive structural body 1 to the shaft hole of the housing of the differential gear as the application target, and the support portion 11b is a portion for integrally attaching the first body portion 5 and the second body portion 6.

The lip support portion 12 has, for example, a shape such that the seal lip 21 is disposed at a desired position in the conductive structural body 1. As illustrated in, for example, FIG. 1, the lip support portion 12 is a portion that is annular and plate-shaped and extends in the radial direction from an end of the tubular portion 11 on the outer side toward the inner periphery side. The reinforcement ring 10 is formed as, for example, an integral member from a metal plate by pressing or forging, and the tubular portion 11 and the lip support portion 12 are portions of the reinforcement ring 10, which are integrally formed from the same material, and are integrally continuous. Examples of the metal material of the reinforcement ring 10 include stainless steel and cold rolled steel sheet (SPCC).

The elastic body portion 20 is attached to the reinforcement ring 10 as described above and is integral with the reinforcement ring 10 so as to cover the reinforcement ring 10 from the inner side as illustrated in, for example, FIG. 1. The seal lip 21 is configured to contact the output shaft of the differential gear from the outer periphery side. The elastic body portion 20 includes, for example, a base portion 22, a gasket portion 23, and a support portion 24 in addition to the seal lip 21. The base portion 22 is a portion of the elastic body portion 20, which extends mainly on a surface of the reinforcement ring 10 on the inner side across the tubular portion 11 and the lip support portion 12 of the reinforcement ring 10. The seal lip 21 extends from the base portion 22 toward the inner side. The gasket portion 23 is a portion that covers the fitting portion 11a of the reinforcement ring 10 from the outer periphery side, and is a portion that is press-fitted into the shaft hole of the housing of the differential gear. An outer peripheral surface 23a of the gasket portion 23 has a diameter such that the outer peripheral surface 23a is compressed between the through-hole of the housing of the differential gear and the fitting portion 11a of the tubular portion 11 of the reinforcement ring 10 and is pressed against the through-hole of the housing of the differential gear.

The support portion 24 is a portion that covers the support portion 11b of the reinforcement ring 10 from the outer periphery side and is a portion for supporting the second body portion 6. As described above, the second body portion 6 is attached to the first body portion 5, and specifically, for example, the support portion 24 of the elastic body portion 20 of the first body portion 5 can be fitted to the second body portion 6. Accordingly, the second body portion 6 is supported by the support portion 24 of the elastic body portion 20 of the first body portion 5, and the second body portion 6 is fixed to the first body portion 5. For example, an outer peripheral surface 24a of the support portion 24 has a diameter such that the outer peripheral surface 24a is compressed between a fitted portion of the second body portion 6 and the support portion 11b of the tubular portion 11 of the reinforcement ring 10 and is pressed against the fitted portion of the second body portion 6.

As described above, the elastic body portion 20 is formed of an elastic material. Examples of the elastic material of the elastic body portion 20 include various rubber materials. Examples of the various rubber materials include synthetic rubbers such as nitrile rubber (NBR), hydrogenated nitrile rubber (H-NBR), acrylic rubber (ACM), and fluororubber (FKM). The elastic body portion 20 is shaped, for example, by crosslinking (vulcanization) molding using a mold. During the crosslinking molding, the reinforcement ring 10 is disposed in the mold, the elastic body portion 20 is bonded to the reinforcement ring 10 by crosslinking adhesion, and accordingly, the elastic body portion 20 is shaped integrally with the reinforcement ring 10. Note that, in the illustrated example, the elastic body portion 20 does not cover surfaces of the reinforcement ring 10 the lip support portion 12 on the outer side, but the elastic body portion 20 may partially or entirely cover the surfaces of the reinforcement ring 10 the lip support portion 12 on the outer side.

As illustrated in FIG. 1, the second body portion 6 of the closure member 2 includes a support ring 30 that is an annular member around the axis line x, and an elastic body portion 40 that is an annular member around the axis line x, formed of an elastic material, and attached to the support ring 30. The elastic body portion 40 includes a side lip 41 that is annular and extends toward the outer side, which is a side opposite to the first body portion 5 in the direction of the axis line x. The side lip 41 increases in diameter as progress toward the outer side in the direction of the axis line x. Specifically, the side lip 41 is configured to contact, from the inner side, either the output shaft of the differential gear or a deflector provided on the output shaft.

As illustrated in FIG. 1, the support ring 30 includes, for example, a tubular portion 31 that is tubular, a support portion 32 that bends toward the inner side from an end portion of the tubular portion 31 on the outer side and extends toward the inner periphery side, and a side lip support portion 33 that extends toward the inner periphery side from an inner periphery end portion of the support portion 32. The tubular portion 31 is the above-described portion fitted to the first body portion 5. The tubular portion 31 is, for example, a portion in a cylindrical or substantially cylindrical shape having a central axis or a substantially central axis at the axis line x. An inner peripheral surface 31a of the tubular portion 31 that faces the inner periphery side is shaped such that the support portion 24 of the elastic body portion 20 of the first body portion 5 is press-fitted into the inner periphery side of the tubular portion 31. Specifically, the inner peripheral surface 31a of the tubular portion 31 is shaped such that the support portion 24 of the elastic body portion 20 of the first body portion 5 is press-fitted into the inner periphery side of the tubular portion 31 through the conductive path member 3. Specifically, the diameter of the inner peripheral surface 31a of the tubular portion 31 is set to a value such that the support portion 24 of the elastic body portion 20 of the first body portion 5 is press-fitted into the inner periphery side of the tubular portion 31 through the conductive path member 3. In other words, the diameter of the inner peripheral surface 31a of the tubular portion 31 is set to a value such that the conductive path member 3 is press-fitted into the inner periphery side of the tubular portion 31.

The tubular portion 31 is configured to be press-fitted into the shaft hole of the differential gear. Specifically, the diameter of an outer peripheral surface 31b of the tubular portion 31 is set to a value such that the tubular portion 31 is press-fitted into the shaft hole of the differential gear. In other words, the diameter of the outer peripheral surface 31b of the tubular portion 31 is set to a value larger than the diameter of the shaft hole of the differential gear. Note that the tubular portion 31 may be configured not to be press-fitted into the shaft hole of the differential gear. In this case, the diameter of the outer peripheral surface 31b of the tubular portion 31 is set to a value equal to the diameter of the shaft hole of the differential gear or smaller than the diameter.

As illustrated in FIG. 1, an end 31c that is an end of the tubular portion 31 of the support ring 30 on the inner side forms a space with the first body portion 5 in the direction of the axis line x in an assembled state of the conductive structural body 1 in which the second body portion 6 is integrally attached to the first body portion 5 through the conductive path member 3. Specifically, in the conductive structural body 1 in the assembled state, the end 31c of the tubular portion 31 of the support ring 30 faces the gasket portion 23 of the elastic body portion 20 of the first body portion 5 with an annular gap 7 in the direction of the axis line x.

The support portion 32 is a portion that sandwiches the conductive path member 3 with the first body portion 5 in the direction of the axis line x. As illustrated in FIG. 1, the support portion 32 is, for example, a portion that is annular and plate-shaped and extends toward the inner periphery side in the radial direction from an end of the tubular portion 31 on the outer side. The support portion 32 extends in, for example, a circle annular shape along a plane orthogonal to the axis line x. The support portion 32 extends toward the inner periphery side so as to include a portion that faces the lip support portion 12 of the reinforcement ring 10 of the first body portion 5 in the direction of the axis line x in a state in which the second body portion 6 is attached to the first body portion 5.

The side lip support portion 33 is a portion that supports the side lip 41 and where the side lip 41 can be formed. As illustrated in, for example, FIG. 1, the side lip support portion 33 extends obliquely toward the outer side from the inner periphery end portion of the support portion 32 toward the inner periphery side. This prevents failure in assembly of the first body portion 5 and the second body portion 6 into an intended state due to interference of the elastic body portion 40 with other portions when the first body portion 5 and the second body portion 6 are integrally assembled.

The support ring 30 is formed as, for example, an integral member from a metal plate by pressing or forging, and the tubular portion 31, the support portion 32, and the side lip support portion 33 are portions of the support ring 30, which are integrally formed from the same material, and are integrally continuous. Examples of the metal material of the support ring 30 include stainless steel and cold rolled steel sheet (SPCC).

The support ring 30 is exposed on the surface of the conductive structural body 1 as illustrated in FIG. 1 and is exposed outside the housing of the differential gear in a usage state of being attached to the differential gear. Thus, the support ring 30 is likely to be exposed to foreign matter such as mud water, rainwater, and dust in the usage state. To suppress occurrence of corrosion such as rust on the support ring 30 due to exposure to foreign matter, for example, rust prevention treatment is applied to the surface of the support ring 30. Note that rust prevention treatment does not necessarily need to be applied to the surface of the support ring 30. In particular, in a case where the support ring 30 is covered by a base portion 42, rust prevention treatment does not necessarily need to be applied to the surface of the support ring 30.

The side lip 41 has, for example, a form similar to a side lip of a well-known sealing device such as a well-known differential side seal used in a differential device. As illustrated in, for example, FIG. 1, the side lip 41 extends from the base portion 42 as a portion of the elastic body portion 40, which is attached to a tip end portion of the side lip support portion 33 of the support ring 30. Note that the base portion 42 may extend from the tip end portion of the side lip support portion 33 to another portion of the side lip support portion 33 and cover the other portion, may extend to a portion of the support portion 32 and cover the portion of the support portion 32, or may extend to a portion of the tubular portion 31 and cover the support portion 32 and the portion of the tubular portion 31. Alternatively, the entirety of the support ring 30 may be covered by the base portion 42.

As described above, the side lip 41 increases in diameter as progress toward the outer side in the direction of the axis line x and has, for example, a conical tubular or substantially conical tubular shape extending along the axis line x. A plurality of grooves 43 that are annular around the axis line x are provided on an inner peripheral surface 41a of the side lip 41, which faces the inner periphery side. The grooves 43 is provided, for example, on the side of a tip end portion 41b of the side lip 41. The grooves 43 are grooves for holding grease applied to the side lip 41. Note that the tip end portion 41b of the side lip 41 is a portion on a tip end side of the side lip 41, in other words, its end on the outer side and its vicinity.

In the side lip 41, in the usage state of the conductive structural body 1, the inner peripheral surface 41a of the tip end portion 41b contacts, from the inner side in the direction of the axis line x, a deflector attached to the output shaft of the differential gear or a deflector integrally formed on the output shaft of the differential gear.

As described above, the elastic body portion 40 is formed of an elastic material. Examples of the elastic body of the elastic body portion 40 include various rubber materials. Examples of the various rubber materials include synthetic rubbers such as nitrile rubber (NBR), hydrogenated nitrile rubber (H-NBR), acrylic rubber (ACM), and fluororubber (FKM). The elastic body portion 40 is shaped by crosslinking (vulcanization) molding using a mold. During the cross-linking molding, the support ring 30 is disposed in the mold, the elastic body portion 40 is bonded to the support ring 30 by crosslinking adhesion, and the elastic body portion 40 is shaped integrally with the support ring 30.

As illustrated in FIG. 1, the conductive path member 3 includes, for example, a conductive member 50 that is a member having conductivity and annular around the axis line x. The conductive path member 3 also includes a metal ring 60 as a metallic member that is an annular member around the axis line x and formed of a metallic material. The conductive member 50 and the metal ring 60 overlaps each other in the direction of the axis line x, and the metal ring 60 is exposed on the outer periphery side.

The conductive member 50 is a member for forming the conductive path 4 between the housing and the output shaft in the differential gear. The conductive member 50 includes an inner periphery end portion 53 that is an annular inner periphery end portion around the axis line x, and the inner periphery end portion 53 is configured to contact the output shaft of the differential gear in the usage state of the conductive structural body 1.

As illustrated in, for example, FIG. 1, the conductive member 50 is a member that is annular around the axis line x and plate-shaped, and includes a contact side surface 51 and a back surface 52, which are a pair of surfaces that are annular and face away from each other in the direction of the axis line x. As illustrated in FIG. 1, the contact side surface 51 faces the outer side in the direction of the axis line x, and the back surface 52 faces the inner side in the direction of the axis line x. The conductive member 50 has an inner periph-ery end 50a that is annular at an end on the inner periphery side, and has an outer periphery end 50b that is annular at an end on the outer periphery side. The inner periphery end 50a defines, on the inner periphery side, a space (through-hole) that penetrates the conductive member 50 in the direction of the axis line x. The inner periphery end 50a extends, for example, along a circle centered at the axis line x. Similarly, the outer periphery end 50b extends, for example, along a circle centered at the axis line x.

As illustrated in FIG. 1, the inner periphery end portion 53 of the conductive member 50 protrudes further toward the inner periphery side than an inner periphery end 22a that is an end of the base portion 22 of the elastic body portion 20 of the first body portion 5 on the inner periphery side. As described above, the inner periphery end portion 53 of the conductive member 50 is configured to contact the output shaft of the differential gear in the usage state of the conductive structural body 1, and accordingly, the diameter of the inner periphery end 50a of the conductive member 50 is smaller than the diameter of the output shaft of the differential gear. Note that, at the inner periphery end portion 53 of the conductive member 50, one or a plurality of non-illustrated notches extending in the radial direction from the inner periphery end 50a may be formed around the axis line x. In a case where the conductive member 50 has a plurality of notches, and the plurality of notches are pro-vided, for example, at equal angular intervals or substan-tially equal angular intervals around the axis line x. The notches can reduce resistance of the conductive member 50 against the output shaft.

The conductive member 50 is sandwiched and supported between the lip support portion 12 of the reinforcement ring 10 of the first body portion 5 and the support portion 32 of the support ring 30 of the second body portion 6, and accordingly, the outer periphery end 50b of the conductive member 50 is positioned in the radial direction in a range of the radial direction where the lip support portion 12 and the support portion 32 face each other in the direction of the axis line x, or is positioned on the outer periphery side of the range of the radial direction where the lip support portion 12 and the support portion 32 face each other in the direction of the axis line x, such that the conductive member 50 includes a portion sandwiched between the lip support portion 12 of the reinforcement ring 10 of the first body portion 5 and the support portion 32 of the support ring 30 of the second body portion 6. Note that, in the illustrated example, the outer periphery end 50b of the conductive member 50 is posi-tioned on the outer periphery side of the range of the radial direction where the lip support portion 12 and the support portion 32 face each other in the direction of the axis line x.

As illustrated in, for example, FIG. 1, the conductive member 50 extends along a plane orthogonal to the axis line x and has a hollow disk or substantially disk shape. Note that the inner periphery end portion 53 of the conductive member 50 or the inner periphery end portion 53 and its vicinity do not necessarily need to extend along the plane orthogonal to the axis line x. For example, the inner periphery end portion 53 of the conductive member 50 or the inner periphery end portion 53 and its vicinity may be curved so as to be recessed on the back surface 52 side and may be curved so as to decrease in diameter as progress toward the inner side in the direction of the axis line x. The inner periphery end portion 53 of the conductive member 50 or the inner periphery end portion 53 and its vicinity may extend along a surface that is a combination of a flat surface and a curved surface. Note that the inner periphery end portion 53 of the conductive member 50 or the inner periphery end portion 53 and its vicinity are portions on the inner periphery side of the portion sandwiched between the lip support portion 12 of the reinforcement ring 10 of the first body portion 5 and the support portion 32 of the support ring 30 of the second body portion 6.

The conductive member 50 is formed of a material having conductivity as described above. The material of the conductive member 50 is, for example, polytetrafluoroethylene (PTFE) having conductivity. The material of the conductive member 50 is not limited to PTFE having conductivity but may be, for example, another resin having conductivity, rubber having conductivity, or fiber such as non-woven fabric having conductivity.

The conductive path member 3 includes, for example, a support member 70 as a member that supports the conductive member 50. The support member 70 is a member that overlaps the back surface 52 of a conductive member 60 so that the inner periphery end portion 53 of the conductive member 50 can be pressed toward the inner periphery side. As illustrated in, for example, FIG. 1, the support member 70 is a member that is annular around the axis line x and plate-shaped, and includes a pressing side surface 71 and a back surface 72, which are a pair of surfaces that are annular and face away from each other in the direction of the axis line x. As illustrated in FIG. 1, the pressing side surface 71 faces the outer side, and the back surface 72 faces the inner side. The support member 70 has an inner periphery end 70a that is annular at an end on the inner periphery side, and has an outer periphery end 70b that is annular at an end on the outer periphery side. The inner periphery end 70a defines, on the inner periphery side, a space (through-hole) that penetrates the support member 70 in the direction of the axis line x. The inner periphery end 70a extends, for example, along a circle centered at the axis line x. Similarly, the outer periphery end 70b extends, for example, along a circle centered at the axis line x.

The support member 70 overlaps the conductive member 50 in the direction of the axis line x. Specifically, as illustrated in FIG. 1, the pressing side surface 71 of the support member 70 faces and contacts the back surface 52 of the conductive member 50. As illustrated in FIG. 1, the conductive member 50 and the support member 70 have, for example, shapes such that the conductive member 50 and the support member 70 overlap each other in alignment when viewed in the direction of the axis line x. Specifically, the back surface 52 of the conductive member 50 and pressing side surface 71 of the support member 70 have the same or substantially the same shape and size, and the inner periphery end 50a and the outer periphery end 50b of the conductive member 50 coincide with or substantially coincide with the inner periphery end 70a and the outer periphery end 70b of the support member 70, respectively, so that the conductive member 50 and the support member 70 overlap each other. Note that, the inner periphery end 50a and the outer periphery end 50b of the conductive member 50 do not necessarily need to coincide with the inner periphery end 70a and the outer periphery end 70b of the support member 70, respectively. In this case, for example, the inner periphery end 70a of the support member 70 is positioned on the outer periphery side of the inner periphery end 50a of the conductive member 50.

Figure 2:
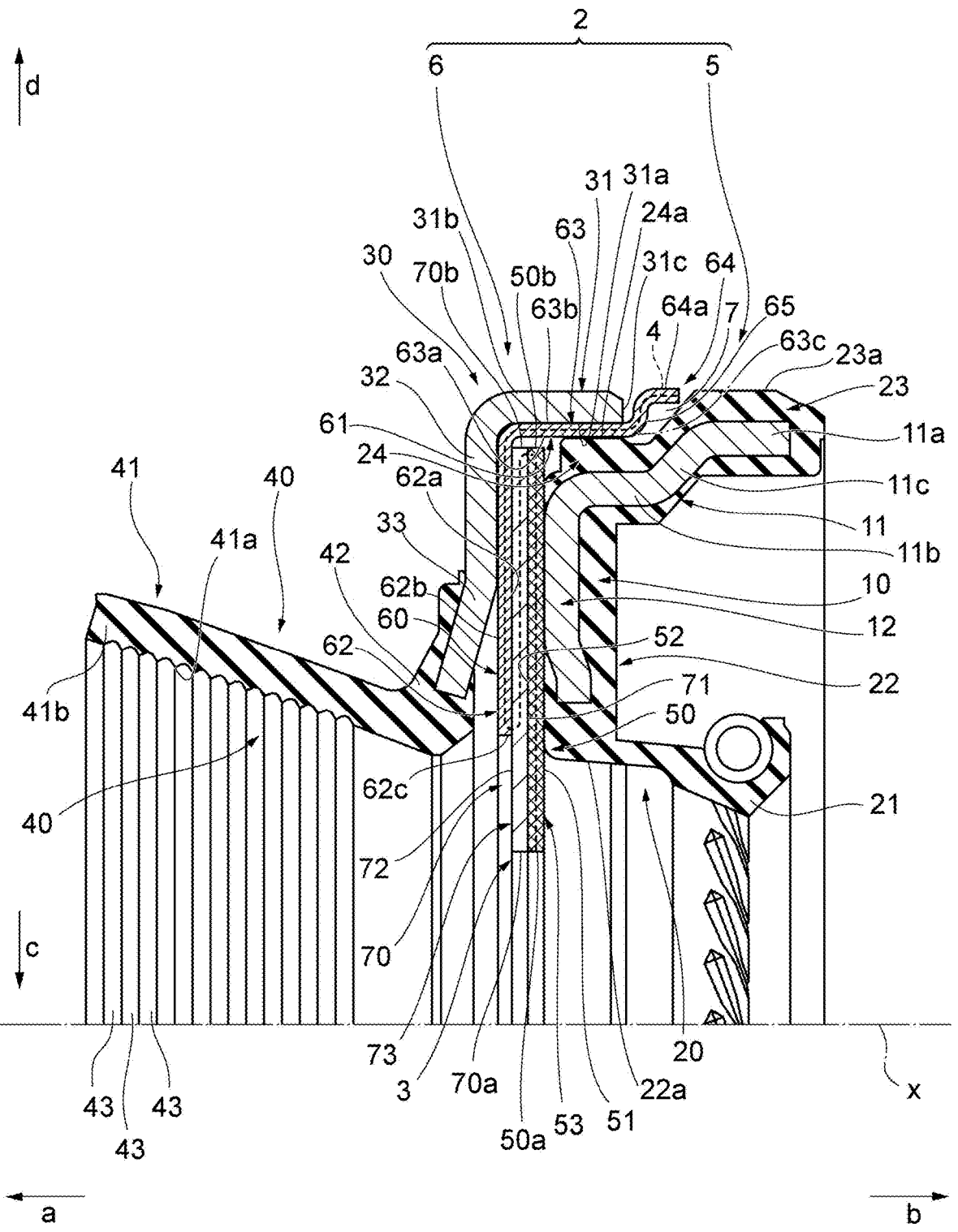
FIG. 2 is a cross-sectional view of an example of a modification of the conductive structural body.

As illustrated in FIGS. 1 and 2, similarly to the conductive member 50, the support member 70 extends along a plane orthogonal to the axis line x and has a hollow disk or substantially disk shape. Note that, similarly to the conductive member 50, an inner periphery end portion 73 of the support member 70 or the inner periphery end portion 73 and its vicinity do not necessarily need to extend along the plane orthogonal to the axis line x. For example, similarly to the conductive member 50, the inner periphery end portion 73 of the support member 70 or the inner periphery end portion 73 and its vicinity may be curved so as to be recessed on the back surface 72 side and may be curved so as to decrease in diameter as progress toward the inner side in the direction of the axis line x. Similarly to the conductive member 50, the inner periphery end portion 73 of the support member 70 or the inner periphery end portion 73 and its vicinity may extend along a surface that is a combination of a flat surface and a curved surface. Note that the inner periphery end portion 73 of the support member 70 or the inner periphery end portion 73 and its vicinity are portions on the inner periphery side of the portion sandwiched between the lip support portion 12 of the reinforcement ring 10 of the first body portion 5 and the support portion 32 of the support ring 30 of the second body portion 6.

The support member 70 is a member having elasticity and is, for example, a plate spring. The support member 70 is formed of an elastic material, and various kinds of elastic materials can be used as the elastic material of the support member 70. The support member 70 may or may not have conductivity.

The metal ring 60 is a member for forming, together with the conductive member 50, the conductive path 4 between the housing and the output shaft in the differential gear. As described above, the metal ring 60 is exposed on the outer periphery side, and this exposed portion contacts the housing of the differential gear in the usage state of the conductive structural body 1.

As illustrated in FIG. 1, the metal ring 60 includes, for example, a tubular portion 61 that is tubular, and a contact portion 62 that bends toward the inner side from an end portion of the tubular portion 61 on the outer side and extends toward the inner periphery side. The tubular portion 61 includes, for example, a fitting portion 63 that is a portion on the outer side, and a contact end portion 64 that is a portion on the inner side. The fitting portion 63 is a portion fitted between the first body portion 5 and the second body portion 6. Specifically, the support portion 24 of the elastic body portion 20 of the first body portion 5 is press-fitted on the inner periphery side of the fitting portion 63, and the fitting portion 63 is press-fitted on the inner periphery side of the tubular portion 31 of the support ring 30 of the second body portion 6. The fitting portion 63 has, for example, a cylindrical or substantially cylindrical shape having a central axis or a substantially central axis at the axis line x. Specifically, for example, the diameter of an inner peripheral surface 63a of the fitting portion 63 is smaller than the diameter of the outer peripheral surface 24a of the support portion 24 of the elastic body portion 20 of the first body portion 5, and the diameter of an outer peripheral surface 63b of the fitting portion 63 is larger than the diameter of the inner peripheral surface 31a of the tubular portion 31 of the support ring 30 of the second body portion 6. Note that an inner peripheral surface 61a is a surface that faces the inner periphery side of a fitting portion 61, and an outer peripheral surface 61b is a surface that faces the outer periphery side of the fitting portion 61. Note that the shape and size of the fitting portion 63 are not limited to the above-described form, but only need to have a form in which the fitting portion 63 is sandwiched between the support portion 24 of the elastic body portion 20 of the first body portion 5 and the tubular portion 31 of the support ring 30 of the second body portion 6 and the first body portion 5 and the second body portion 6 are fixed to each other between the support portion 24 of the elastic body portion 20 and the tubular portion 31 of the support ring 30. In this case, for example, the fitting portion 63 may have a shape with a wavy section such that the fitting portion 63 extends in a circumferential direction around the axis line x while alternately protruding on the outer periphery side and the inner periphery side. Alternatively, the fitting portion 63 may have a shape in which gaps are formed at intervals in the circumferential direction and that intermittently extends in the circumferential direction.

As illustrated in FIG. 1, the contact end portion 64 is positioned on the outer periphery side of the fitting portion 63, and the contact end portion 64 is configured to contact an inner peripheral surface of the shaft hole of the housing of the differential gear in the usage state of the conductive structural body 1. The contact end portion 64 has, for example, a cylindrical or substantially cylindrical shape having a central axis or a substantially central axis at the axis line x. Specifically, for example, the diameter of an outer peripheral surface 64a of the contact end portion 64 is equal to the diameter of the inner peripheral surface of the shaft hole of the housing of the differential gear or is larger than the diameter. Note that the outer peripheral surface 64a is a surface that faces the outer periphery side of the contact end portion 64. Note that the shape and size of the contact end portion 64 are not limited to the above-described form but the contact end portion 64 only needs to contact the inner peripheral surface of the shaft hole of the housing of the differential gear in the usage state of the conductive structural body 1. In this case, for example, the contact end portion 64 may have a shape with a wavy section such that the contact end portion 64 extends in the circumferential direction around the axis line x while alternately protruding on the outer periphery side and the inner periphery side. Alternatively, the contact end portion 64 may have a shape in which gaps are formed at intervals in the circumferential direction and that intermittently extends in the circumferential direction.

As illustrated in FIG. 1, the fitting portion 63 and contact end portion 64 connect to each other through a step portion 65. The step portion 65 is a portion that forms a step in the radial direction. The size of the step of the step portion 65 in the radial direction is a size such that the contact end portion 64 can contact the inner peripheral surface of the shaft hole of the housing of the differential gear as described above. The fitting portion 63 is formed such that the step portion 65 and the contact end portion 64 are positioned in the gap 7 in the direction of the axis line x between the gasket portion 23 of the elastic body portion 20 of the first body portion 5 and the tubular portion 31 of the support ring 30 of the second body portion 6. Specifically, for example, the length of the fitting portion 63 in the direction of the axis line x is adjusted such that the step portion 65 and the contact end portion 64 are positioned in the gap 7 in the direction of the axis line x between the gasket portion 23 of the elastic body portion 20 of the first body portion 5 and the tubular portion 31 of the support ring 30 of the second body portion 6. As illustrated in, for example, FIG. 1, the length of the fitting portion 63 in the direction of the axis line x is set such that the position of an end (end 63c) of the fitting portion 63 on the inner side in the direction of the axis line x is the same or substantially the same as the position of the end 31c of the tubular portion 31 of the support ring 30 of the second body portion 6 on the inner side in the direction of the axis line x.

As illustrated in, for example, FIG. 1, the contact portion 62 is a member that is annular around the axis line x and plate-shaped, and includes a side surface 62a and a side surface 62b, which are a pair of surfaces that are annular and face away from each other in the direction of the axis line x. As illustrated in FIG. 1, the side surface 62a faces toward the inner side, and the side surface 62b faces the outer side. A connection portion 62 has an inner periphery end 62c that is annular at an end on the inner periphery side. The inner periphery end 62c defines, on the inner periphery side, a space (through-hole) that penetrates the connection portion 62 in the direction of the axis line x. The inner periphery end 62c extends, for example, along a circle centered at the axis line x. The position of the inner periphery end 62c in the radial direction is a position such that deformation of the conductive member 50 is not encumbered when the output shaft is inserted in the usage state of the conductive structural body 1. As illustrated in, for example, FIG. 1, the position of the inner periphery end 62c in the radial direction is positioned on the outer periphery side of the end (end 22a) of the base portion 22 of the elastic body portion 20 of the first body portion 5 on the inner periphery side. Note that the position of the inner periphery end 62c in the radial direction is not limited to this position.

The metal ring 60 is formed of a metal material having conductivity. The metal ring 60 is formed as, for example, an integral member from a metal plate by pressing or forging, and the tubular portion 61 and the contact portion 62 are portions of the metal ring 60, which are integrally formed from the same material, and are integrally continuous. The metal material of the reinforcement ring 10 is, for example, a metal material having high conductivity. Note that the material of the metal ring 60 is not limited to metal but may be any other material having conductivity.

In the conductive path member 3, for example, the support member 70 is positioned on the inner side of the conductive member 50, and the contact portion 62 of the metal ring 60 is positioned on the outer side of the conductive member 50. Specifically, the pressing side surface 71 of the support member 70 contacts the back surface 52 of the conductive member 50. The side surface 62a of the contact portion 62 of the metal ring 60 on the inner side is separated on the outer periphery side from the inner periphery end 50a of the conductive member 50 as described above, and contacts the contact side surface 51 of the conductive member 50. The support member 70 may be fixed to the conductive member 50 by bonding or the like, and in the conductive structural body 1 assembled as described later, the conductive member 50 and the support member 70 may be sandwiched between the lip support portion 12 of the reinforcement ring 10 of the first body portion 5 and the support portion 32 of the support ring 30 of the second body portion 6, and contact the conductive member 50 in an immovable manner relative to each other. Similarly, the conductive member 50 may be fixed to the metal ring 60 by bonding or the like, and in the conductive structural body 1 assembled as described later, the conductive member 50 and the metal ring 60 may be sandwiched between the lip support portion 12 of the reinforcement ring 10 of the first body portion 5 and the support portion 32 of the support ring 30 of the second body portion 6, and contact in an immovable manner relative to each other.

The conductive structural body 1 has a configuration as described above and is produced when the first body portion 5 and the second body portion 6 are integrally assembled through the conductive path member 3. Specifically, the support portion 24 of the elastic body portion 20 of the first body portion 5 is press-fitted into the fitting portion 63 of the tubular portion 61 of the metal ring 60 of the conductive path member 3 being placed over as described above. Then, the fitting portion 63 of the tubular portion 61 of the metal ring 60 of the conductive path member 3 to which the support portion 24 of the elastic body portion 20 of the first body portion 5 is press-fitted into the tubular portion 31 of the support ring 30 of the second body portion 6. The conductive path member 3 is sandwiched between the lip support portion 12 of the reinforcement ring 10 of the first body portion 5 and the support portion 32 of the support ring 30 of the second body portion 6, and accordingly, the conductive structural body 1 is assembled. Note that the order of assembly is not limited thereto. Specifically, after the fitting portion 63 of the tubular portion 61 of the metal ring 60 of the conductive path member 3 is press-fitted into the tubular portion 31 of the support ring 30 of the second body portion 6, the support portion 24 of the elastic body portion 20 of the first body portion 5 may be press-fitted into the fitting portion 63 of the tubular portion 61 of the metal ring 60 of the conductive path member 3.

A conductive structural body 3 may be sandwiched as described above between the first body portion 5 and the second body portion 6 when the first body portion 5 and the second body portion 6 are pressed in a direction approaching each other in the direction of the axis line x. Moreover, the conductive structural body 3 may be brought into contact with the lip support portion 12 of the reinforcement ring 10 of the first body portion 5, and thereafter, the conductive structural body 3 may be brought into contact with the support portion 32 of the support ring 30 of the second body portion 6. Alternatively, the conductive structural body 3 may be brought into contact with the support portion 32 of the support ring 30 of the second body portion 6, and thereafter, the conductive structural body 3 may be brought into contact with the lip support portion 12 of the reinforcement ring 10 of the first body portion 5.

As illustrated in FIG. 1, in the conductive structural body 1 in the assembled state, the conductive path member 3 is sandwiched between the lip support portion 12 of the reinforcement ring 10 of the first body portion 5 and the support portion 32 of the support ring 30 of the second body portion 6. Specifically, the support member 70 of the conductive path member 3 is in contact with the lip support portion 12 of the reinforcement ring 10 of the first body portion 5, and the contact portion 62 of the metal ring 60 of the conductive path member 3 is in contact with the support portion 32 of the support ring 30 of the second body portion 6. In the conductive path member 3 sandwiched between the first body portion 5 and the second body portion 6, the conductive member 50 is in contact with the metal ring 60. The conductive member 50 and the metal ring 60 both have conductivity, and the conductive path 4 is formed by the conductive member 50 and the metal ring 60.

The conductive member 50 protrudes into a space defined by the first body portion 5 and the second body portion 6 on the inner periphery side, and the inner periphery end 50a of the conductive member 50 is positioned in the space defined by the first body portion 5 and the second body portion 6 on the inner periphery side. The contact end portion 64 of the metal ring 60 is exposed on surfaces of the first body portion 5 and the second body portion 6 on the outer periphery side. Accordingly, the conductive path 4 formed by the conductive member 50 and the metal ring 60 extends into the space defined by the first body portion 5 and the second body portion 6 on the inner periphery side and a space on the outer periphery side of the first body portion 5 and the second body portion 6. In this manner, the conductive path 4 formed by the conductive member 50 and the metal ring 60 penetrate the closure member 2 and extend in the radial direction.

Subsequently, an example of a modification of the conductive structural body 1 will be described below. FIG. 2 is a cross-sectional view of the example of the modification of the conductive structural body 1. As illustrated in FIG. 2, in the conductive path member 3, the support member 70 may overlap so as to contact the conductive member 50 from outside. In this case, the contact side surface 51 of the conductive member 50 faces the inner side, and the back surface 52 faces the outer side. The pressing side surface 71 of the support member 70 faces the inner side, and the back surface 72 faces the outer side.

Figure 3:
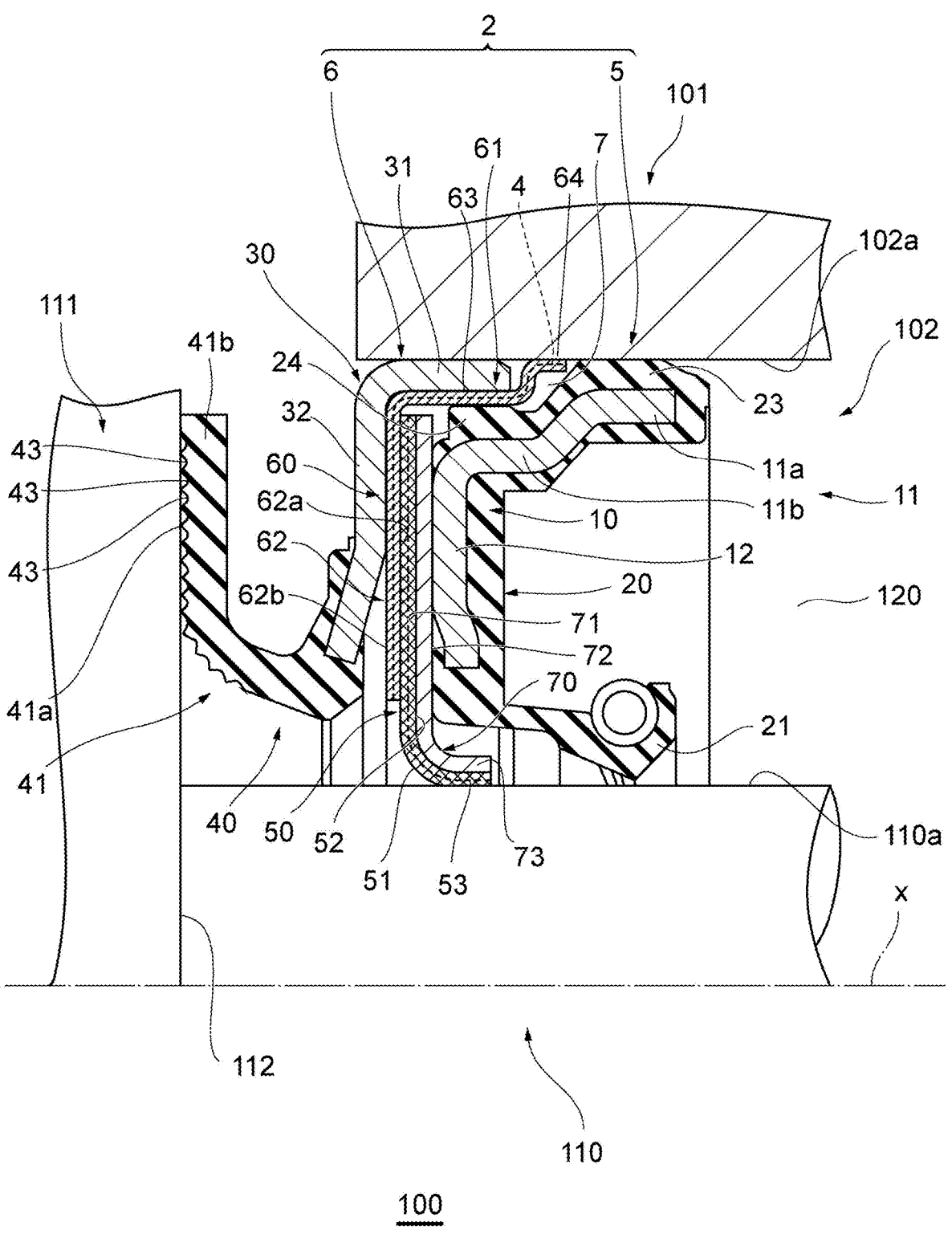
FIG. 3 is a cross-sectional view illustrating the conductive structural body in a usage state of being attached to an application target of the conductive structural body.

Subsequently, effects of the conductive structural body 1 having the above-described configuration will be described below. FIG. 3 is a cross-sectional view illustrating the conductive structural body 1 in the usage state in which the conductive structural body 1 is attached to an application target. The application target of the conductive structural body 1 is, for example, a differential gear 100 as described above. The differential gear 100 is, for example, a differential gear in the transaxle of an eAxle, which is an electric drive unit for electric vehicles (EVs) such as battery electric vehicles (BEVs) and hybrid vehicles.

As illustrated in FIG. 3, the differential gear 100 includes a housing 101 surrounding mechanisms inside the differential gear 100, and an output shaft 110 for outputting power. The housing 101 and a main force shaft 110 of the differential gear 100 are made of metal. A shaft hole 102 that is a through-hole for externally protruding the output shaft 110 is formed in the housing 101, and the output shaft 110 extends to the outside through the shaft hole 102 of the housing 101. A deflector 111 is provided at a portion of the output shaft 110 outside the housing 101. The deflector 111 forms a surface 112 extending from an outer peripheral surface 110a of the output shaft 110 along a plane orthogonal to the axis line of the main force shaft 110. The deflector 111 may be a member that is separate from the output shaft 110 and fitted onto the outer peripheral surface 110a of the output shaft 110, or may be integrally formed with the output shaft 110. A gap 120 that is annular is formed between the output shaft 110 and the shaft hole 102 of the housing 101, and the conductive structural body 1 forms a conductive path in the gap 120. The conductive structural body 1 also functions as a differential side seal.

As illustrated in FIG. 3, the conductive structural body 1 is attached in the gap 120 between the housing 101 of the differential gear 100 and the output shaft 110 and brought into the usage state. Specifically, as illustrated in FIG. 3, the conductive structural body 1 is inserted into the shaft hole 102 such that the outer periphery side of the conductive structural body 1 faces an inner peripheral surface 102a of the shaft hole 102 of the housing 101, the output shaft 110 is inserted into a space surrounded by the conductive structural body 1 on the inner periphery side, and the side lip 41 of the second body portion 6 contacts the deflector 111, and accordingly, the conductive structural body 1 is brought into the usage state.

Specifically, in the usage state, the gasket portion 23 of the elastic body portion 20 of the first body portion 5 is press-fitted into the shaft hole 102 of the housing 101, and the gasket portion 23 is compressed in the radial direction between the inner peripheral surface 102a of the shaft hole 102 and the fitting portion 11a of the reinforcement ring 10 of the first body portion 5. Accordingly, sealing of the shaft hole 102 of the housing 101 is ensured on the outer periphery side of the conductive structural body 1. The tubular portion 31 of the support ring 30 of the second body portion 6 is press-fitted into the shaft hole 102, and the tubular portion 31 is fixed to the shaft hole 102. Accordingly, the side lip 41 is fixed relative to the housing 101. Note that, when the tubular portion 31 is not in contact with the inner peripheral surface 102*a* of the shaft hole 102, the tubular portion 31 is not press-fitted into the shaft hole 102.

As illustrated in FIG. 3, in the usage state, the seal lip 21 is in contact with the outer peripheral surface 110*a* of the output shaft 110, and accordingly, sealing of the shaft hole 102 of the housing 101 is ensured on the inner periphery side of the conductive structural body 1. As illustrated in FIG. 3, in the usage state, the tip end portion 41*b* of the side lip 41 is in contact with the surface 112 of the deflector 111 from the inner side. Accordingly, entry of foreign matter is prevented, and approach of foreign matter to the seal lip 21 from the outside of the differential gear 100 is prevented or suppressed.

As described above, in the usage state, the first body portion 5 and the second body portion 6 as the closure member 2 close the gap 120 between the housing 101 of the differential gear 100 and the output shaft 110, and sealing of lubricant as a sealing target object into the housing 101 is ensured. Moreover, the first body portion 5 and the second body portion 6 as the closure member 2 prevent or suppress entry of foreign matter into the housing 101 and prevent or suppress approach of foreign matter to the seal lip 21.

As illustrated in FIG. 3, in the usage state, the contact side surface 51 of the inner periphery end portion 53 of the conductive member 50 of the conductive path member 3 is in contact with the outer peripheral surface 110*a* of the output shaft 110, and the inner periphery end portion 53 of the conductive member 50 is pressed and deformed toward the outer periphery side by the output shaft 110. As illustrated in FIG. 3, the inner periphery end portion 53 of the conductive member 50 has a width in the direction of the axis line x and is in contact with the outer peripheral surface 110*a* of the output shaft 110. As illustrated in FIG. 3, in the usage state, the contact end portion 64 of the metal ring 60 of the conductive path member 3 is in contact with the inner peripheral surface 102*a* of the shaft hole 102 of the housing 101, and the metal ring 60 is in contact with the conductive member 50 in the direction of the axis line x. In this manner, the conductive member 50 and the metal ring 60 form the conductive path 4 through which electricity flows between the output shaft 110 and the housing 101 in the usage state. Moreover, the conductive member 50 and the metal ring 60 are sandwiched between the first body portion 5 and the second body portion 6 in the direction of the axis line x, penetrating the closure member 2 in the radial direction and penetrating the conductive structural body 1 in the radial direction. In this manner, the conductive path member 3 penetrates the conductive structural body 1 in the radial direction, forming the conductive path 4 that penetrates the conductive structural body 1 in the radial direction.

As described above, the conductive path member 3 penetrates the closure member 2 in the radial direction, is located between the seal lip 21 and the side lip 41, and extends into a space closed by the closure member 2. Specifically, the conductive path member 3 is in contact with a space isolated from the outer space by the support ring 30 and the side lip 41 of the second body portion 6, and is in contact with a space isolated from the inner space by the seal lip 21 and the gasket portion 23 of the first body portion 5. Accordingly, the conductive path member 3 is located mainly in a space surrounded by the seal lip 21 and the side lip 41 of the closure member 2 forming a sealing structure. Accordingly, exposure of the conductive member 50 and the metal ring 60 of the conductive path member 3 to foreign matter is prevented or suppressed, and corrosion of the conductive member 50 and the metal ring 60 due to foreign matter is prevented or suppressed. In addition, contact of the conductive member 50 and the metal ring 60 of the conductive path member 3 with lubricant as a sealing target object is prevented or suppressed. Accordingly, decrease in the conductivity of the conductive member 50 and the metal ring 60 is prevented or suppressed.

As illustrated in FIG. 3, the support member 70 overlaps the conductive member 50, and the pressing side surface 71 of the support member 70 is in contact with the back surface 52 of the conductive member 50. As described above, in the usage state, the inner periphery end portion 53 of the conductive member 50 is deformed by reaction force toward the outer periphery side from the output shaft 110, and the inner periphery end portion 73 of the support member 70 is deformed by reaction force toward the outer periphery side from the shaft 110 through the inner periphery end portion 53 of the conductive member 50. Since the inner periphery end portion 73 of the support member 70 has elasticity as described above, the inner periphery end portion 73 of the support member 70 is elastically deformed, and reaction force against the force from the output shaft 110 is generated at the inner periphery end portion 73 of the support member 70. Due to the reaction force of the support member 70, the conductive member 50 is pressed against the outer peripheral surface 110*a* of the output shaft 110, and the contact side surface 51 of the conductive member 50 is pressed toward the output shaft 110 and in contact with the outer peripheral surface 110*a* of the output shaft 110.

In this manner, in the usage state, the conductive member 50 is pressed against the outer peripheral surface 110*a* of the output shaft 110 by the reaction force of the support member 70, which contributes to strong contact between the conductive member 50 and the output shaft 110. Moreover, the conformability of the inner periphery end portion 53 of the conductive member 50 to the output shaft 110 is enhanced, which also contributes to strong contact between the conductive member 50 and the output shaft 110. Accordingly, in the conductive structural body 1, contact between the conductive member 50 and the output shaft 110 is stabilized.

As described above, the conductive structural body 1 is formed as an integrated assembly of the first body portion 5, the second body portion 6, and the conductive path member 3. Thus, unlike a case where the conductive path member is a separate body, a plurality of members do not need to be handled, which facilitates manufacturing, management, and other handling processes.

As described above, with the conductive structural body 1 according to the embodiment of the present disclosure, it is possible to suppress decrease in conductivity even when exposed to foreign matter.

The conduction method according to the present disclosure is a conduction method for forming a conductive path in an annular gap, and includes causing a conductive path member to penetrated a closure member in the radial direction, the conductive path member being a member that is annular around an axis line and forms a conductive path, the closure member being a member that is annular around the axis line and closes the gap. The above-described conductive structural body according to the present disclosure is manufactured by performing the conduction method according to the present disclosure. Each processing of the conduction method according to the present disclosure is described in the description of the above-described conductive structural body according to the present disclosure.

While the present disclosure is described above through the above-described embodiment, the technical scope of the present disclosure is not limited to the scope described above in the embodiment. It is apparent to those skilled in the art that various changes and modification can be made to the above-described embodiment. It is apparent from description of the claims that such changed or modified embodiments may also fall within the technical scope of the present disclosure.

The above-described embodiment is intended to facilitate understanding of the present disclosure and is not intended to limit interpretation of the present disclosure. Furthermore, the above-described embodiment does not limit usage targets for which the present disclosure is used, and the present disclosure may be used for any object. Constituent components included in the above-described embodiment, and their disposition, materials, conditions, shapes, sizes, and the like are not limited to those exemplarily described but may be changed as appropriate. For example, the present disclosure encompasses differences that arise in implementation, such as manufacturing tolerances. Moreover, constituent components described in different embodiments may be partially replaced or combined with each other within a range that does not cause technological inconsistencies. Furthermore, configurations may be selectively combined as appropriate so as to achieve at least part of the above-described objects and effects.

For example, the application target of the conductive structural body according to the present disclosure is not limited to the transaxle of an eAxle. The conductive structural body according to the present disclosure can be applied to various kinds of differential mechanisms in which formation of a conductive path for electrical discharging or the like is effective.

What is claimed is:

1. A conductive structural body, comprising:
a conductive path member that is annular around an axis line and is configured to form-forms a conductive path in an annular gap, the conductive path member includes a conductive member that is annular around the axis line and formed of resin rendered conductive, wherein the resin comprises PTFE and is configured to form the conductive path; and
a closure member that is annular around the axis line and includes a first body portion that is a sealing device configured to seal lubricants, wherein
the conductive path member is located next to the first body portion,
the first body portion includes an elastic body portion that is an annular member around the axis line and is formed of an elastic material, and
the elastic body portion includes a gasket portion that is an annular portion around the axis line and is configured to seal an outer periphery side of the conductive structural body.

2. The conductive structural body according to claim 1, wherein the closure member and the conductive path member are integrated.

3. The conductive structural body according to claim 1, wherein
the closure member includes a second body portion, and
the first body portion and the second body portion are configured to be able to be attached to each other in a direction of the axis line with the conductive path member sandwiched in between.

4. The conductive structural body according to claim 3, wherein the first body portion includes a reinforcement ring that is an annular member around the axis line,
the second body portion includes a support ring that is an annular member around the axis line,
the elastic body portion of the first body portion is attached to the reinforcement ring and includes a seal lip that is annular and is configured to contact the output shaft, and
the support ring covers the first body portion from an outer peripheral side through the conductive path member.

5. The conductive structural body according to claim 3, wherein
the elastic body portion includes a support portion that is an annular portion around the axis line and is formed adjacent to the gasket portion in the axis line direction, and
the second body portion is press-fitted into the support portion.

6. The conductive structural body according to claim 1, wherein
the conductive member includes an inner periphery end portion that is an annular portion around the axis line, and
the inner periphery end portion is configured to contact an output shaft.

7. The conductive structural body according to claim 1, wherein
the gasket portion is exposed on the outer periphery side of the conductive structural body.

8. The conductive structural body according to claim 1, wherein
the conductive path member includes a conductive metal ring that has a disk-shaped portion that contacts a disk-shaped portion of the conductive member, and
the elastic body portion includes a support portion that is an annular portion around the axis line and is formed adjacent to the gasket portion in the axis line direction, and
the conductive metal ring is press-fitted into the support portion.

9. A differential device, comprising:
an output shaft having an axis line;
a conductive path member that is annular around the axis line and forms a conductive path in an annular gap around the output shaft, the conductive path member includes a conductive member that is annular around the axis line and formed of resin rendered conductive, wherein the resin comprises PTFE and forms the conductive path in the annular gap, and
a closure member that is annular around the axis line and includes a first body portion that is a sealing device for sealing lubricants, the first body portion being located next to the conductive path member, wherein
the first body portion includes an elastic body portion that is an annular member around the axis line and is formed of an elastic material, and
the elastic body portion includes a gasket portion that is an annular portion around the axis line and is configured to seal an outer periphery side of the conductive structural body.

* * * * *